Feb. 5, 1924.  
B. F. VAVRUSKA  
1,482,827  
THRUST BEARING FOR CRANK SHAFTS  
Filed Dec. 8, 1922  
2 Sheets-Sheet 1
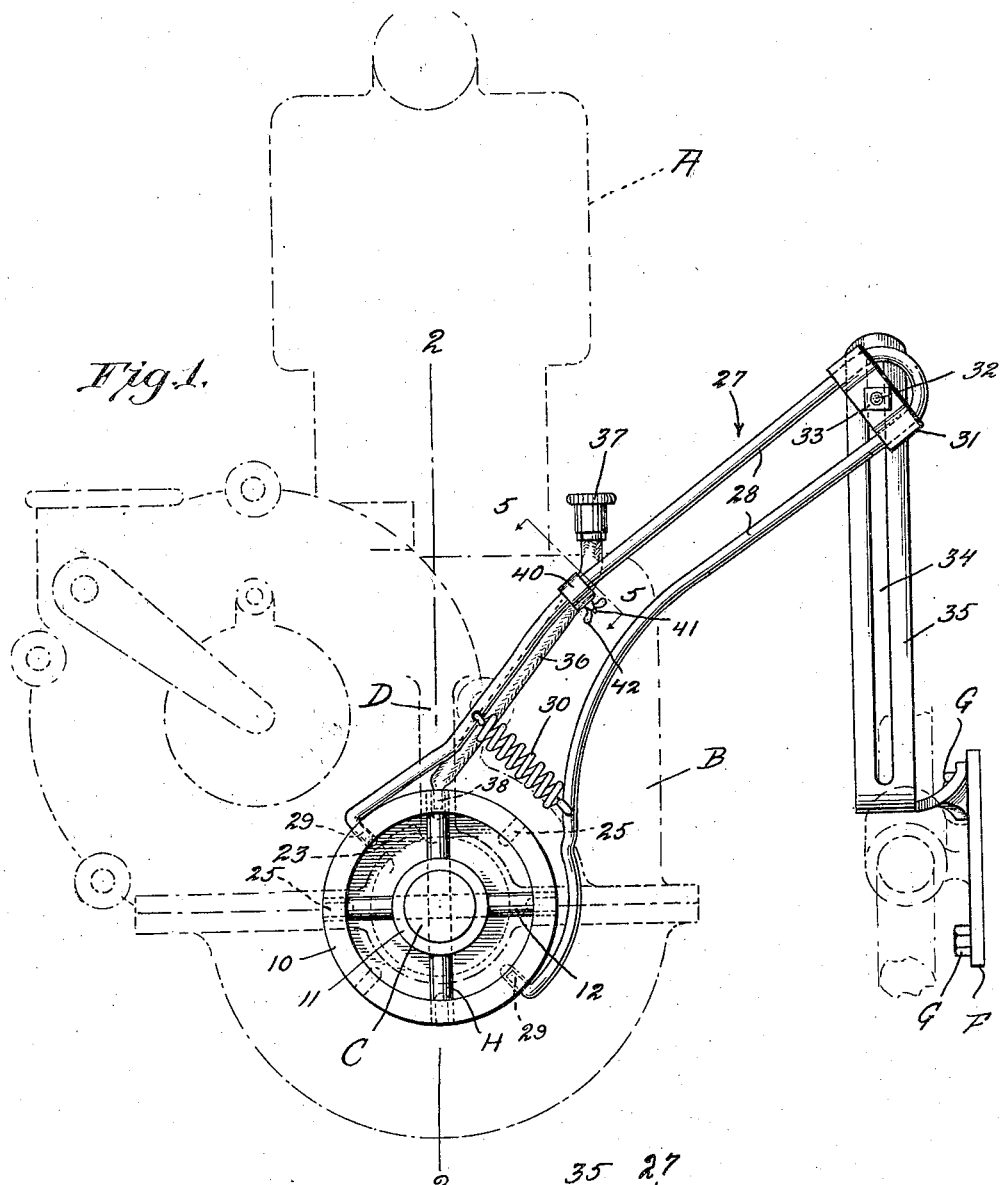
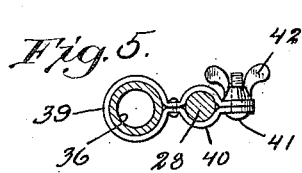
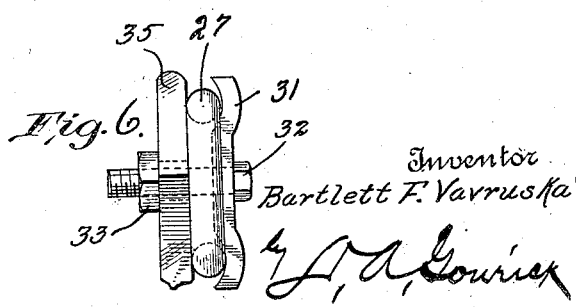
Inventor  
Bartlett F. Vavruska  
Attorney Feb. 5, 1924. 1,482,827
B. F. VAVRUSKA
THRUST BEARING FOR CRANK SHAFTS
Filed Dec. 8, 1922   2 Sheets-Sheet 2
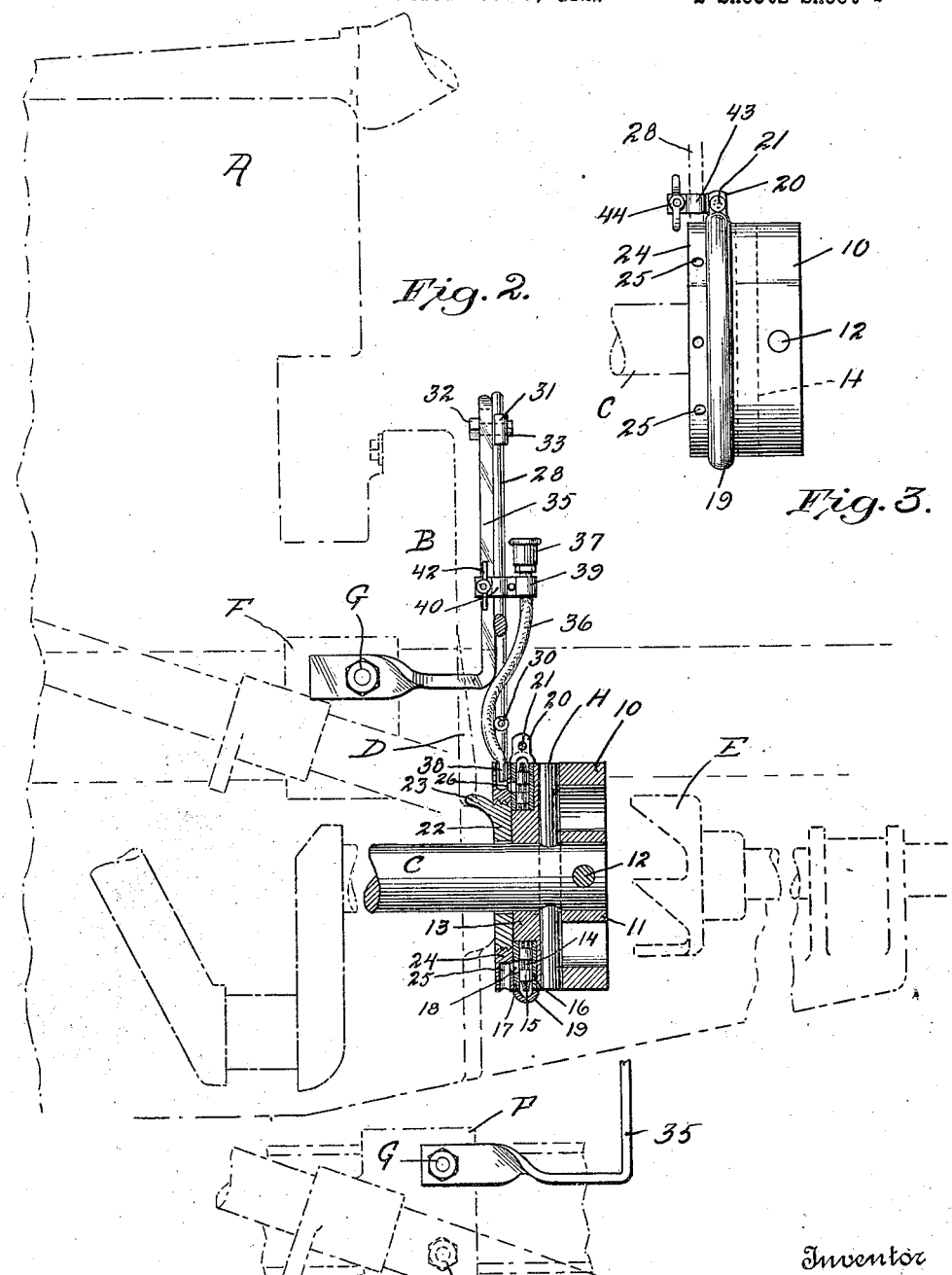
Inventor
Bartlett F. Vavruska
by D. A. Gourick
Attorney Patented Feb. 5, 1924.

1,482,827

UNITED STATES PATENT OFFICE.

BARTLETT F. VAVRUSKA, OF PRAIRIE DU CHIEN, WISCONSIN.

THRUST BEARING FOR CRANK SHAFTS.

Application filed December 8, 1922. Serial No. 605,674.

*To all whom it may concern:*

Be it known that I, BARTLETT F. VAVRUSKA, a citizen of the United States, residing at Prairie du Chien, in the county of Crawford and State of Wisconsin, have invented certain new and useful Improvements in Thrust Bearings for Crank Shafts, of which the following is a specification.

This invention relates to bearings and has for its object the provision of a novel adjustable thrust bearing structure for use upon the crank shafts of autombile engines for the purpose of taking up end thrust for preventing longitudinal play of the crank shaft, the device also operating to take up play which has already occurred so that damage to the mechanism will be positively prevented.

An important and more specific object is the provision of a thrust bearing for this purpose which embodies a roller bearing structure which is fully adjustable by means of a spanner wrench structure which is permanently associated with the bearing device.

Still another object is the provision of a device of this character equipped with novel means for lubricating the roller bearing structure at all times, the lubricating means having associated therewith a protective and retaining housing operating to prevent loss of oil and to exclude dirt and grit from the bearing.

An additional object is the provision of a device of this character which will be simple and inexpensive in manufacture, which may be applied or installed without involving making any changes in the construction of the engine itself, and which is held in place without involving the drilling of any hole or the like which might weaken the engine itself.

With the above and other objects and advantages in view, the invention consists in the details of construction to be hereinafter more fully described and claimed and illustrated in the accompanying drawings in which Figure 1 is a front elevation of my device in applied position, the engine being shown by dotted lines.

Figure 2 is a section on the line 2—2 of Figure 1.

Figure 3 is a detail side elevation of the attachment.

Figure 4 is a detail fragmentary elevation of the guide for the spanner wrench showing it associated with the bracket of the steering gear.

Figure 5 is a detail section on the line 5—5 of Figure 1.

Figure 6 is a plan view of the guide bracket, and showing the association and connection of the spanner wrench handle.

Referring more particularly to the drawings, the letter A designates, rather diagrammatically, a portion of a Ford automobile engine, and B represents the front end through which extends the crank shaft C journaled, of course, in the usual bearings, not shown. It is well to state, at this point, that the front end B of the engine is formed with a web D which is located above the crank shaft and which is of importance in connection with my invention. Carried by the crank shaft is a pulley which operates to drive the fan and which is secured in place by a transverse pin which serves the additional purpose of providing means with which the ratchet E for starting the crank engages when cranking of the motor by hand is necessary. The letter F represents a bracket of the steering gear, which bracket is bolted onto the frame by means of bolts or studs G.

All of the above described parts are old and well known but must be mentioned for the reason that they are essential to a proper understanding of the present device. While the bearings which support the crank shaft are not shown, it is well known that when these bearings become worn on account of the end thrust of the crank shaft they permit the crank shaft to have a certain degree of longitudinal play which is highly deleterious in its effects. Movement of the crank shaft in one direction causes too great a space to occur between the magnets carried by the fly-wheel and the coils of the magneto and this makes starting difficult. Movement of the crank shaft in the other direction will bring the magnets against the coils and cause mutilation of the latter and consequently short circuiting so that the magneto ceases to operate. It is with these facts in view that I have designed the present device.

In carrying out my invention I replace the ordinary pulley with a specially constructed pulley 10 bored out for the passage of the pin H which was originally used for holding the old pulley in place on the shaft. This pulley includes a hub portion 11 through which extends a second pin 12 which cooperates with the starting crank ratchet E. Formed on the rear side of the pulley is a somewhat reduced extension 13 upon which is mounted a roller bearing structure which includes a cage 14 carrying rollers 15 engaged between bearing plates 16 and 17, the latter of which is formed with holes 18 for a purpose to be described. This roller bearing structure has its outer periphery encased by a ring-like housing 19 which is channel shaped in cross section and which prevents the oil in the roller bearing structure from escaping in addition to having the function of excluding dust and dirt. This grease retaining ring is split transversely and has its ends formed with ears 20 through which passes a clamping bolt 21.

Engaged between the extension 13 and the front end of the engine is a disk 22 formed with a lug or horn 23 which engages against the web D for holding the disk against rotation. This disk is externally threaded and engaged thereon is a ring 24 which operates as a nut and which is formed with a series of sockets 25 in its periphery for engagement by the spanner wrench structure to be described, for the purpose of effecting adjustment. The face of this nut ring toward the bearing plate 17 is formed with an oil groove 26 which communicates with all the holes 18 and which also communicates with all of the sockets 25.

In association with this ring 24 I provide a permanently mounted spanner wrench structure which includes a wrench proper 27 formed, for example, from a single length of resilient rod or wire of heavy gage and including arms 28 which have their free ends diverging and terminating in lugs 29 engaging in diametrically opposite ones of the sockets 25. The natural resilience of this wrench is increased by a coil spring 30 which is connected with both arms, as shown, and which holds the wrench proper firmly associated with the nut ring, while at the same time the arms 28 may be spread apart to disengage the lugs 29 from the sockets 25 so that they may be reengaged within another pair of sockets whenever the degree of adjustment is sufficiently great to render this necessary. The outer end of this wrench carries a cross head 31 through which passes a bolt 32 carrying a nut 33, and movable along a slot 34 in an upstanding bracket 35 which is mounted on the bracket F and held by one of the bolts G.

The means for feeding oil to the roller bearing structure consists of a flexible tube 36 which has one end carrying an oil cup 37 and its other end provided with a nozzle 38 which may be inserted into the uppermost one of the sockets 25. This flexible tube is held in position by a clamp 39 which encircles it and which is formed with a portion 40 embracingly engaging the upper arm 28 of the wrench and held firmly thereto by a clamping bolt 41 carrying a nut 42. The lower arm 28 of the wrench serves as anchoring means for the oil retaining ring 19 and for carrying out this function I provide a clamp 43 carried by the bolt 20 and embracing the lower arm of the wrench, the clamp being of course equipped with a suitable nut and bolt 44.

The device is installed on the engine as above described and as illustrated. The member 22 is of course stationary with respect to the engine while the pulley rotates with the crank shaft in the usual manner. The roller bearing structure takes up the friction between these moving parts. In the event of wear of the main bearings of the crank shaft which will permit the crank shaft to have longitudinal movement, the play may be taken out very easily by loosening the nut 33, and moving the wrench 27 so as to turn the nut disk or ring 24. As the nut ring is turned it is apparent that owing to its threaded engagement upon the stationary member 22 it will bear against the wear ring or plate 17 and consequently move the pulley away from the front of the engine and in this way take out the longitudinal play of the shaft. In case the desired result is not accomplished by moving the wrench 27 the limit defined by the guide bracket 35, the arms of the wrench may be easily spread apart and the lugs 29 engaged within a different pair of the sockets 25 and the movement repeated. This may be done as many times as is necessary to prevent the shaft from having any longitudinal play whatever without, however, causing binding of the parts with the resultant disadvantages of excessive friction. When a desired position of the wrench has been obtained, the nut 33 is tightened to hold the wrench rigid with respect to the guide bracket 35.

The oil within the grease or oil cup 37 passes along the flexible tube 36 and is discharged through the nozzle 38 into one of the sockets 25, from which the oil will pass into the distributor groove and then through the holes 18 to the roller bearing structure, waste of oil being prevented by the cage 19.

From the foregoing description and a study of the drawings it will be apparent that I have thus provided a simply constructed and consequently inexpensive adjusting means which may be readily installed with very little labor and in a short time. The device will operate most efficiently for taking out any longitudinal play of the crank shaft and will thus prevent injury to the magneto coils.

While I have shown and described the preferred embodiment of my invention, it is of course to be understood that I reserve the right to make such changes in the form, construction and arrangement of parts as will not depart from the spirit of the invention or the scope of the subjoined claims.

I claim:

1. A thrust bearing structure for the crank shaft of internal combustion engines, comprising a pulley secured upon the crank shaft and replacing the usual pulley, said pulley being formed with a reduced extension carrying a roller bearing structure, a stationary member disposed against the front of the engine and having a threaded periphery, and a nut ring screwed onto said threaded periphery in engagement with the roller bearing structure and provided with means for engagement by a wrench.

2. A thrust bearing structure for the crank shaft of internal combustion engines, comprising a pulley secured upon the crank shaft and replacing the usual pulley, said pulley being formed with a reduced extension carrying a roller bearing structure, a stationary member disposed against the front of the engine and having a threaded periphery, and a nut ring screwed on the said threaded periphery in engagement with the roller bearing structure and provided with means for engagement by a wrench consisting of a plurality of sockets located about the periphery of the nut ring and engageable by the inturned ends of the arms of a spanner wrench.

3. A thrust bearing structure for automobile engines, comprising a pulley secured upon the engine crank shaft and replacing the ordinary pulley, a roller bearing structure carried by the pulley, a disk member disposed against the front of the engine and formed with a lug engaging a web thereof for holding the disk stationary, a nut ring threaded upon the outside of said stationary member and engaging the roller bearing structure, and a spanner wrench permanently carried by said nut ring and operable to effect rotation thereof.

4. A thrust bearing structure for automobile engines, comprising a pulley secured upon the engine crank shaft and replacing the ordinary pulley, a roller bearing structure carried by the pulley, a disk member disposed against the front of the engine and formed with a lug engaging a web thereof for holding the disk stationary, a nut ring threaded upon the outside of said stationary member and engaging the roller bearing structure, a spanner wrench permanently carried by said nut ring and operable to effect rotation thereof, and means for holding the spanner wrench in adjusted position.

5. A thrust bearing structure for automobile engines, comprising a pulley secured upon the engine crank shaft and replacing the ordinary pulley, a roller bearing structure carried by the pulley, a disk member disposed against the front of the engine and formed with a lug engaging a web thereof for holding the disk stationary, a nut ring threaded upon the outside of said stationary member and engaging the roller bearing structure, a spanner wrench permanently carried by said nut ring and operable to effect rotation thereof, and means for holding the spanner wrench in adjusted position consisting of a stationary guide having a slot, and a cross head carried by the handle of the spanner wrench and having a clamping bolt passing through said slot.

6. A thrust bearing structure for automobile engine crank shaft, comprising a pulley secured upon the crank shaft and replacing the usual pulley, a roller bearing structure carried by said pulley, a stationary member disposed against the front end of the engine, a nut ring screwed onto said stationary member and bearing against the roller bearing structure, said nut ring being formed with sockets for engagement by a spanner wrench, and means for lubricating the roller bearing structure.

7. A thrust bearing structure for automobile engine crank shafts, comprising a pulley secured upon the crank shaft and replacing the usual pulley, a roller bearing structure carried by said pulley, a stationary member disposed against the front end of the engine, a nut ring screwed onto said stationary member and bearing against the roller bearing structure, said nut ring being formed with sockets for engagement by a spanner wrench, and means for lubricating the roller bearing structure consisting of a flexible tube carrying an oil cup and terminating in a nozzle disposable within a selected one of said sockets, said nut ring being formed with a circular groove communicating with the sockets and communicating with holes in the roller bearing structure.

8. A thrust bearing structure for automobile engine crank shafts, comprising a pulley secured upon the crank shaft and replacing the usual pulley, a roller bearing structure carried by said pulley, a stationary member disposed against the front end of the engine, a nut ring screwed onto said stationary member and bearing against the roller bearing structure, said nut ring being formed with sockets for engagement by a spanner wrench, and means for lubricating the roller bearing structure consisting of a flexible tube carrying an oil cup and terminating in a nozzle disposable within a selected one of said sockets, said nut ring being formed with a circular groove communicating with the sockets and communicating with holes in the roller bearing structure, and an oil retainer consisting of a split ring of channel-shape engaged exteriorly of the roller bearing structure and mounted stationary with respect thereto.

In testimony whereof I hereto affix my signature.

BARTLETT F. VAVRUSKA.